H. LAURENCE.
Rotary Engine.
No. 230,880. Patented Aug. 10, 1880.
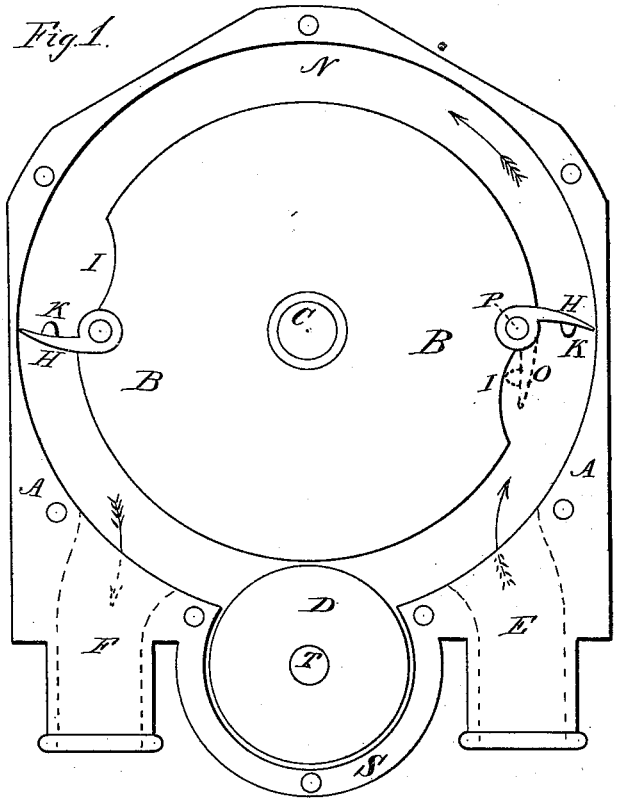
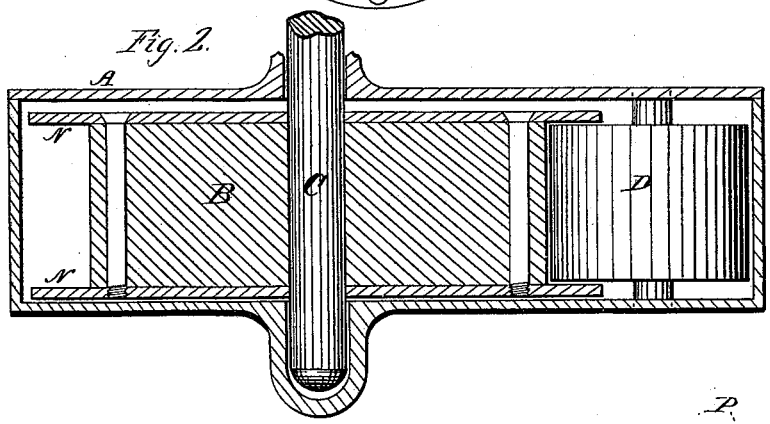
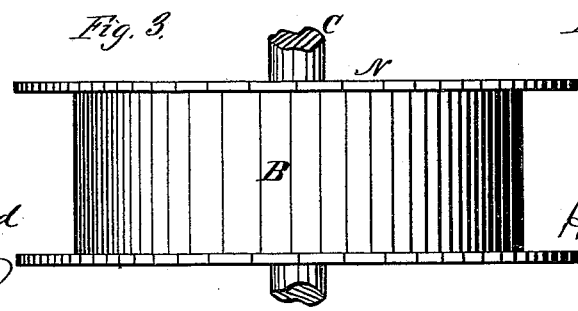
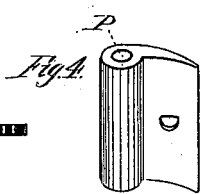
Witnesses:
Inventor:
Henry Laurence

UNITED STATES PATENT OFFICE.

HENRY LAURENCE, OF CHICAGO, ILLINOIS.

ROTARY ENGINE.

SPECIFICATION forming part of Letters Patent No. 230,880, dated August 10, 1880.

Application filed September 8, 1879.

*To all whom it may concern:*

Be it known that I, HENRY LAURENCE, of the city of Chicago, in the county of Cook and State of Illinois, have invented certain new and useful Improvements in Rotary Engines, which improvements are fully set forth in the following specification and accompanying drawings, of which—

Figure 1 is a view with one side of the casing removed to show the internal working of the engine. Fig. 2 is a cross-sectional view, showing the arrangement of the rotary abutment with the internal revolving wheel. Fig. 3 shows a view of the internal revolving wheel, and Fig. 4 shows one of the piston-wings detached from the internal revolving wheel.

The nature and object of this invention is to provide a cheap and efficient rotary engine to be worked either by water, steam, or air.

Similar letters of reference refer to similar parts in the different drawings.

A is the case inclosing the operative parts of my rotary engine. It should be made of metal or other suitable material, with the inside turned upon a circle perfectly smooth and ready to admit the closely-fitting internal revolving wheel B, with its disks, as hereinafter described. To this wheel B are attached two circular disks, N N, upon each side, and of larger diameter than said wheel. These disks must fit closely to the inner periphery of the case A.

C is a central shaft or axis upon which the wheel B revolves. H H are piston-wings attached to the periphery of the wheel B and between the disks N N. These piston-wings work freely upon their pivots P.

I I are recesses cut out in the periphery of the wheel B at the rear of each wing. K is a lug extending from and attached to the rear side of each piston-wing. These recesses are scalloped in the periphery of wheel B, and made longer than the piston-wings H H. The lug K upon each bucket prevents the piston-wing from fitting closely into the recess, and holds it up a short distance, as shown at O, Fig. 1. This lug can be attached to the wheel B within the recess. This construction of the wheel B, recesses, and piston-wings maintains an opening into the recess at the free end of the piston-wings.

E and F are pipes leading to and from the surface of the internal wheel, B. D is a rotary abutment located between the two pipes E and F, and working between the disks N N and against the revolving wheel B.

P, Fig. 4, is a view of one of the piston-wings removed from the central wheel, B.

The operation of my invention is as follows: Steam is admitted through the pipe E. It works against the fixed revolving abutment D and piston-wing H, which revolves the wheel B until the second piston-wing H has passed the abutment D, which it does by closing or shutting down against the wheel B over or into the recess I. The lug K prevents the free end of the piston-wing fitting closely over the recess, but keeps it open, ready for the steam to pass into the recess at the free end of the piston-wing. Immediately after the piston-wing has passed the abutment D the steam passes under the closed piston-wing and lifts or turns it up, so that its entire face or surface is presented to the action of the steam. When this piston-wing is turned up, as shown, it closely fits between the disks of wheel B and inner periphery of the case. As soon as the piston-wing has reached the exit-pipe F the steam is discharged through this pipe.

The abutment D works between the disks N N and against the wheel B closely, so as to allow no steam to pass between them. It also fits snugly in the socket S, so as to prevent any steam from passing around it. The abutment D works upon its axis T.

The axis T may be dispensed with, as the abutment revolves freely within its socket and is held in position by it.

The abutment may also be made hollow, or be made of other material than metal—such as hard rubber, celluloid, &c.

The recesses I I are longer than the piston-wings H H, which leaves an opening into the recesses at the end of the piston-wing.

I am aware of the invention of J. H. Connell, No. 191,031, and of the nature of its construction, it having a rubber cushion or spring in the recess on the revolving piston, upon which the hinged valve strikes, and the reaction of the rubber cushion throws the valve open when it has passed the stationary inclined abutment mentioned in the specification. It also shows an arm extending rigidly from the piston-wing, which strikes against a stationary projection, which also opens the hinged wings.

I disclaim the construction and operation of the device shown in said patent. I do not depend upon the action of any rubber spring or any arm extending rigidly from the hinged wings striking against a stationary projection to open my piston-wings. To open my piston-wings I depend entirely upon the pressure of the steam or water after it has passed the revolving abutment. The extension of the recess beyond the free ends of the wings, and the lug K on the under side of the wings, which prevents the wings closing closely against the bottom of the recess, enable the pressure to instantly throw them open when they have passed the rotary abutment.

I claim as new, and desire to secure by Letters Patent, as follows:

1. In a rotary engine, the revolving piston B, having hinged piston-wings provided with lugs K, attached to their under sides, and the recess I, the said recess being of greater length than the piston-wings, enabling the pressure to pass to the under side of the piston-wing and force the same out against the casing, substantially as and for the purpose described.

2. The combination, with the revolving abutment having a continuous circular face, of the revolving piston B, provided with side flanges, N, and piston-wings H, as shown and described.

HENRY LAURENCE.

Witnesses:
  CHAS. RASCHER,
  JAS. A. COWLES.